United States Patent
Kim et al.

(10) Patent No.: US 11,608,832 B2
(45) Date of Patent: Mar. 21, 2023

(54) ROTARY DRIVE FOR AN IMPELLER AND MOTOR ASSEMBLY WITH GAS AND ROLLING BEARINGS ARRANGED IN HOUSING STRUCTURE

(71) Applicant: LG Electronics Inc., Seoul (KR)

(72) Inventors: Sunggi Kim, Seoul (KR); Byungjik Kim, Seoul (KR); Eunji Hwang, Seoul (KR); Donghan Kim, Seoul (KR); Changlae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 121 days.

(21) Appl. No.: 16/631,823

(22) PCT Filed: Oct. 22, 2018

(86) PCT No.: PCT/KR2018/012508
§ 371 (c)(1),
(2) Date: Jan. 16, 2020

(87) PCT Pub. No.: WO2019/083238
PCT Pub. Date: May 2, 2019

(65) Prior Publication Data
US 2020/0248702 A1    Aug. 6, 2020

(30) Foreign Application Priority Data
Oct. 23, 2017  (KR) ................ 10-2017-0137787
Sep. 21, 2018  (KR) ................ 10-2018-0113952

(51) Int. Cl.
*F04D 25/06*   (2006.01)
*F04D 29/056*  (2006.01)
(Continued)

(52) U.S. Cl.
CPC ....... *F04D 25/0606* (2013.01); *F04D 25/062* (2013.01); *F04D 29/056* (2013.01);
(Continued)

(58) Field of Classification Search
CPC ............ F04D 25/0606; F04D 25/0262; F04D 29/053; F04D 29/056; F04D 29/057;
(Continued)

(56) References Cited

U.S. PATENT DOCUMENTS 4,394,091 A * 7/1983 Klomp .................. F16C 39/02
                                                    384/126
4,701,651 A   10/1987 Tanaka
(Continued)

FOREIGN PATENT DOCUMENTS

JP    H0554821       7/1993
JP    2005163642     6/2005
(Continued)

OTHER PUBLICATIONS

Kamiyama, "JP2008232289A_MT.pdf" (Machine Translation 2007) (Year: 2007).*
(Continued)

*Primary Examiner* — Kenneth J Hansen
(74) *Attorney, Agent, or Firm* — Fish & Richardson P.C.

(57) ABSTRACT

The present embodiment comprises: a rotary shaft; a rotor mounted on the rotary shaft; a stator for encompassing the outer circumference of the rotor; an impeller mounted on the rotary shaft so as to be spaced from the rotor; a bearing housing having a through-hole through which the rotary shaft passes; a rolling bearing disposed in the bearing housing and coupled to the rotary shaft; and a gas bearing disposed in the bearing housing so as to be spaced from the rolling bearing in an axial direction, and facing the outer circumference of the rotary shaft.

17 Claims, 7 Drawing Sheets

(51) Int. Cl.
    *F04D 29/059* (2006.01)
    *F04D 29/057* (2006.01)
    *F01D 25/16* (2006.01)
    *F04D 29/053* (2006.01)
    *H02K 7/14* (2006.01)

(52) U.S. Cl.
    CPC ......... *F04D 29/057* (2013.01); *F04D 29/059* (2013.01); *F01D 25/162* (2013.01); *F04D 29/053* (2013.01); *F16C 2360/44* (2013.01); *H02K 7/14* (2013.01)

(58) Field of Classification Search
    CPC .... F04D 29/059; F01D 25/162; F16C 33/046; F16C 17/02; F16C 2360/44
    See application file for complete search history.

(56) References Cited

U.S. PATENT DOCUMENTS

| | | | | |
|---|---|---|---|---|
| 6,255,752 B1 * | 7/2001 | Werner | ............ | F16C 17/10 310/90.5 |
| 2011/0027112 A1 * | 2/2011 | Negishi | ............ | H02K 5/1675 417/423.7 |
| 2011/0176757 A1 * | 7/2011 | Heldmann | ............ | F16C 27/02 384/29 |

FOREIGN PATENT DOCUMENTS

| | | |
|---|---|---|
| JP | 2008232289 | 10/2008 |
| KR | 19990000361 | 1/1999 |
| KR | 20100033857 | 3/2010 |
| KR | 101004701 | 1/2011 |
| KR | 101633673 | 6/2016 |
| WO | WO-2012169183 A1 * | 12/2012 ........... F04D 25/062 |

OTHER PUBLICATIONS

Extended European Search Report in European Appln. No. 18869845.0, dated Jun. 29, 2021, 8 pages.

Office Action in Australian Appln. No. 2018354513, dated Nov. 2, 2021, 4 pages.

* cited by examiner

ROTARY DRIVE FOR AN IMPELLER AND MOTOR ASSEMBLY WITH GAS AND ROLLING BEARINGS ARRANGED IN HOUSING STRUCTURE

CROSS-REFERENCE TO RELATED APPLICATIONS

This application is a National Stage application under 35 U.S.C. § 371 of International Application No. PCT/KR2018/012508, filed on Oct. 22, 2018, which claims the benefit of Korean Patent Application No. 10-2017-0137787, filed on Oct. 23, 2017, and Korean Patent Application No. 10-2018-0113952, filed on Sep. 21, 2018. The disclosures of the prior applications are incorporated by reference in their entirety.

TECHNICAL FIELD

The present invention relates to a motor, and more particularly, to a motor having a plurality of bearings.

BACKGROUND ART

A motor may be installed in a household appliance such as a cleaner. In this case, driving force for suctioning air into a dust collection part may be generated.

One example of such a motor may include a motor housing, a stator installed in the motor housing, a rotor rotating by the stator, and a rotary shaft on which the rotor is mounted. The rotary shaft of the motor may be rotatably supported by at least one bearing, and the rotary shaft may rotate at a high speed in the state of being supported on the bearing.

The motor may include a rotor assembly in which the rotor, a bearing cartridge, and an impeller are connected to the rotary shaft. One example of the rotor assembly is disclosed in U.S. Patent Publication No. US 2010/0215491 A1 (Published on Aug. 26, 2010).

In the rotor assembly disclosed in the above-mentioned prior art document, a pair of bearings are surrounded by a sleeve, and a spring is disposed between the pair of bearings so that the rotary shaft supports at two points.

DISCLOSURE OF THE INVENTION

Technical Problem

An object of the present invention is to provide a motor that is capable of more stably supporting a rotary shaft while minimizing concentric errors of a plurality of bearings and while being lightweight.

Technical Solution

According to an embodiment of the present invention, since a rolling bearing and a gas bearing support a rotary shaft together, a motor may be lightweight when compared to a case in which a pair of rolling bearings support the rotary shaft, and vibration generated when a concentric error between a pair of rolling bearings is large may be minimized to extend a lifespan of a motor.

As described above, when the rolling bearing and the gas bearing support the rotary shaft together, the rotary shaft that rotates at a high speed of tens of thousands of rpm or more may be more reliably supported. Also, in this embodiment, noise may be minimized when compared to the case in which the rotary shaft is supported by the pair of rolling bearings, and maximum rpm of a small high-speed motor may increase.

The rotary shaft may include an impeller coupling portion to which an impeller is coupled, a rotor coupling portion to which a rotor is coupled, and a support portion supported by the rolling bearing and the gas bearing. The supporter may be disposed between the impeller coupling portion and the rotor coupling portion in the axial direction. Also, the rolling bearing and the gas bearing may support the supporter together while being spaced apart from each other.

The rolling bearing and the gas bearing may be mounted in one bearing housing. In this case, the motor may decrease in number of component when compared to a case in which the bearing housing for supporting the rolling bearing and the bearing housing for supporting the gas bearing are separately provided.

A through-hole through which the rotary shaft passes may be defined in the bearing housing, and the rolling bearing may be disposed in the bearing housing and coupled to the rotary shaft. Also, the gas bearing may be disposed in the bearing housing so as to be spaced apart from the rolling bearing in the axial direction.

When the impeller and the rotor are mounted on the rotary shaft, the rotary shaft, the impeller, and the rotor may constitute a rotor assembly, and a portion of the rotor assembly, on which the rotor is mounted, may be heavier than a portion of the rotor assembly, on which the impeller is mounted. Also, a degree of dropping of a portion of the rotary shaft, on which the rotor is mounted, may be greater than a degree of a portion of the rotary shaft, on which the impeller is mounted.

In consideration of the degree of dropping of the rotor assembly, it is preferable that the rolling bearing of the rolling bearing and the gas bearing is closer to the rotor.

When the gas bearing is closer to the rotor, the degree of drooping of the portion of the rotary shaft, which is closer to the rotor, may be too large. In this case, the rolling bearing and the gas bearing may not stably support the rotary shaft.

On the other hand, when the rolling bearing is closer to the rotor than the gas bearing, the rolling bearing may more stably support the rotary shaft at a position that is close to the rotor and may support the rotary shaft without minimizing the drooping and shaking of the rotor assembly.

For this, the rotor, the impeller, the rolling bearing, and the gas bearing may be arranged in the order of the rotor, the rolling bearing, the gas bearing and the impeller in the axial direction.

It is preferable that the rolling bearing is disposed as close to the rotor as possible. For this, the rolling bearing may be disposed closer to the rotor of the rotor and the impeller.

When the rolling bearing and the gas bearing support the rotary shaft as described above, the rotary shaft may include an inner ring contact portion contacting an inner ring of the rolling bearing, and a gas bearing facing portion that radially faces the gas bearing.

In this case, a center of gravity of the rotor assembly may be defined between the inner ring contact pat and the gas bearing facing portion of the rotary shaft. It is preferable that the rolling bearing contacts the bearing at a position as close as possible to the rotor assembly. For this, a distance between the center of gravity of the rotor assembly and the inner ring contact portion may be less than a distance between the center of gravity of the rotor assembly and the gas bearing facing portion or be equal to a distance between the center of gravity of the rotor assembly and the gas bearing facing portion.

The rolling bearing may support the rotor assembly as stably as possible between the center of gravity of the rotor assembly and the rotor. Also, when the rotary shat rotates at a high speed, the gas bearing may support a portion between the rolling bearing and the impeller by using a gas such as air.

That is, when the rotary shaft rotates a low speed, the rolling bearing may support the rotary shaft as stably as possible. When rotary shaft rotates a high speed, the rolling bearing and the gas bearing may reliably support the rotary shaft.

In this embodiment, it is also possible that the center of gravity of the rotor assembly is defined at the inner ring contact portion of the rotary shaft.

A bearing clearance may be defined between the gas bearing and the rotary shaft, and the gas bearing may support the rotary shaft by using the gas in the bearing clearance.

If the bearing clearance has a sufficient length in the axial direction, the gas in the bearing clearance may float the rotary shaft. If an axial length of the bearing clearance is too short, an amount of gas for floating the rotary shaft may be insufficient, and the gas such as air may not reliably support the rotary shaft.

Since the gas bearing supports the rotary shaft at a position spaced apart from the rolling bearing, the gas bearing may be spaced a predetermined distance from the rolling bearing.

If the bearing clearance has a sufficient length in the axial direction, and the gas bearing is spaced a predetermined distance from the rolling bearing, the gas bearing may be disposed as close as possible to the impeller.

For this, the gas bearing may be closer to the impeller of the rotor and the impeller. Also, the gas bearing may be closer to the impeller of the rolling bearing and the impeller.

A gas bearing mounting part on which the gas bearing is mounted may be disposed in the bearing housing. Also, the gas bearing has an inner surface spaced apart from an outer circumferential surface of the rotary shaft and an outer surface contacting the gas bearing mounting part disposed in the baring housing. In this case, a bearing clearance may be defined between the outer circumferential surface of the rotary shaft and the inner surface of the gas bearing so that the gas in the air floats the rotary shaft.

The gas bearing may be provided as small as possible in a radial direction so as to be miniaturized and reduced in material cost. An outer diameter of the gas bearing may be less than an outer diameter of the rolling bearing, and the motor may be as lightweight as possible.

The inner diameter of the gas bearing may be greater than the inner diameter of the rolling bearing. When the rotary shaft is provided to have the outer diameter as constant as possible, it may be easy to be manufactured and reduced in manufacturing cost.

The rotary shaft may include the gas bearing facing portion facing the gas bearing and an inner ring mounting part on which the inner ring of the rolling bearing is mounted. When the outer diameter of the gas bearing facing portion and the inner diameter of the inner ring mounting part are the same, the manufacturing cost of the rotary shaft may be reduced. The inner diameter of the gas bearing may be greater than the inner diameter of the rolling bearing.

A coating layer may be disposed on the inner surface of the gas bearing to minimize wear of the rotary shaft. The gas bearing may be manufactured by be rolled in a right arc shape in a state in which the coating layer is disposed on one surface of a metal plate body. In this case, a lone slit is defined in the gas bearing in the axial direction. The gas bearing includes a bush and a coating layer applied on an inner surface of the bush.

The gas bearing may also provide a coating layer on an inner surface of the hollow cylindrical bush. In this case, a coating process of the coating layer may be complicated, and the coating layer may not be uniformly applied on the inner surface of the hollow cylindrical bush.

On the other hand, the coating layer of the gas bearing according to the present invention may be applied as uniformly as possible to maximize the lifespan of the gas bearing.

The rotary shaft may include an inner ring contact portion to which the inner ring of the rolling bearing contacts and an impeller coupling portion to which the impeller is coupled, and the coating layer may face a portion between the inner ring contact portion and the impeller coupling portion of the rotary shaft.

The bearing housing may include a rolling bearing housing portion and a gas bearing housing portion. The rolling bearing housing portion may surround an outer surface of the rolling bearing to face the rotor in the axial direction. The gas bearing housing portion may surround an outer surface of the gas bearing to face the impeller in the axial direction.

An inner diameter of the gas bearing housing portion may be less than an inner diameter of the rolling bearing housing portion. In this case, the gas bearing may be minimized in thickness, and the gas bearing and the motor may be as lightweight as possible.

If the inner diameter of the gas bearing housing portion is the same as the inner diameter of the rolling bearing housing portion, the thickness of the gas bearing should be thick to a level close to the thickness of the rolling bearing.

On the other hand, when the inner diameter of the gas bearing housing portion is less than the inner diameter of the rolling bearing housing portion, the thickness of the gas bearing may be thinner by a difference between the inner diameters, the material cost of the gas bearing may be reduced, and the weight may be reduced.

A gap may be defined between the gas bearing housing portion and the impeller to communicate with the bearing clearance between the gas bearing and the rotary shaft. When the gas bearing operates, the gas such as air may smoothly enter the bearing clearance.

The bearing housing may further include a connector. The connector may connect the rolling bearing housing portion to the gas bearing housing portion. An inner diameter of the connector may be less than an outer diameter of an outer ring of the rolling bearing. In this case, the outer ring of the rolling bearing may be axially hooked with the connector. The connector may function as a stopper to limit axial movement of the rolling bearing.

The inner diameter of the connector may be less than the inner diameter of the rolling bearing housing portion and greater than the inner diameter of the gas bearing housing portion. In this case, a space through which the gas such as air passes may be defined between the connector and the rotary shaft, and the gas such as air may smoothly enter the bearing clearance through the space when the gas bearing operates.

On the other hand, the rotary shaft may include a large diameter part and a small diameter part.

The rotor may be mounted on the large diameter part, and the impeller and the rolling bearing may be disposed on the small diameter part.

An outer diameter of one end of the large diameter part in the axial direction may be greater than an inner diameter of the inner ring of the rolling bearing, and the rolling bearing may be hooked with the one end of the large diameter part in the axial direction.

The small diameter part may face the gas bearing in the radial direction.

The small diameter part may include an inner ring contact portion contacting the inner ring of the rolling bearing and a gas bearing facing portion that radially faces the gas bearing, and an outer diameter of the inner ring contact portion and an outer diameter of the gas bearing facing portion may be the same. In this case, the outer diameter of the small diameter part may be as constant as possible, the manufacturing cost of the rotary shaft may be reduced.

According to another example of the motor, a gas bearing may be disposed between a rolling bearing and a rotor in an axial direction, and the rolling bearing may be disposed between a gas bearing and an impeller in the axial direction.

The gas bearing may face a large diameter part. In this case, an area facing the rotary shaft may be greater than that of a case in which the gas bearing faces the small diameter part, and a sufficient wide passage through which a gas such as air may flow between the gas bearing and the rotary shaft may be secured. That is, an axial length of the gas bearing may be minimized.

Also, the rolling bearing may be coupled to the small diameter part. In this case, the rolling bearing may be miniaturized more than when the rolling bearing is mounted on the large diameter part, and the motor may be lightweight.

Advantageous Effects

According to an embodiment of the present invention, since the rolling bearing and the gas bearing support the rotary shaft through the combination thereof, the motor may be lightweight when compared to the case in which the pair of rolling bearings support the rotary shaft, and the concentric error between the pair of rolling bearings may be solved.

Also, the rolling bearing having the higher load supporting capacity among the gas bearing and the rolling bearing may be disposed closer to the rotor, and thus, the rotary shaft may be more stably supported, and the shaking of the rotor may be minimized.

Also, the rolling bearing may support the center of gravity of the rotor assembly, which is the assembly of the rotary shaft and the impeller and the rotor, or may support the portion close to the center of gravity, and thus, the rotor or the impeller may stably rotate while minimizing the drooping or shaking thereof.

Also, the rolling bearing may stably support the rotor assembly while the rotor assembly rotates at the low speed.

Also, since the outer diameter of the gas bearing is less than the outer diameter of the rolling bearing, it may be possible to reduce the weight of the gas bearing and to reduce the material cost of the gas bearing.

MODE FOR CARRYING OUT THE INVENTION

Hereinafter, detailed embodiments will be described in detail with reference to the accompanying drawings.

Figure 1:
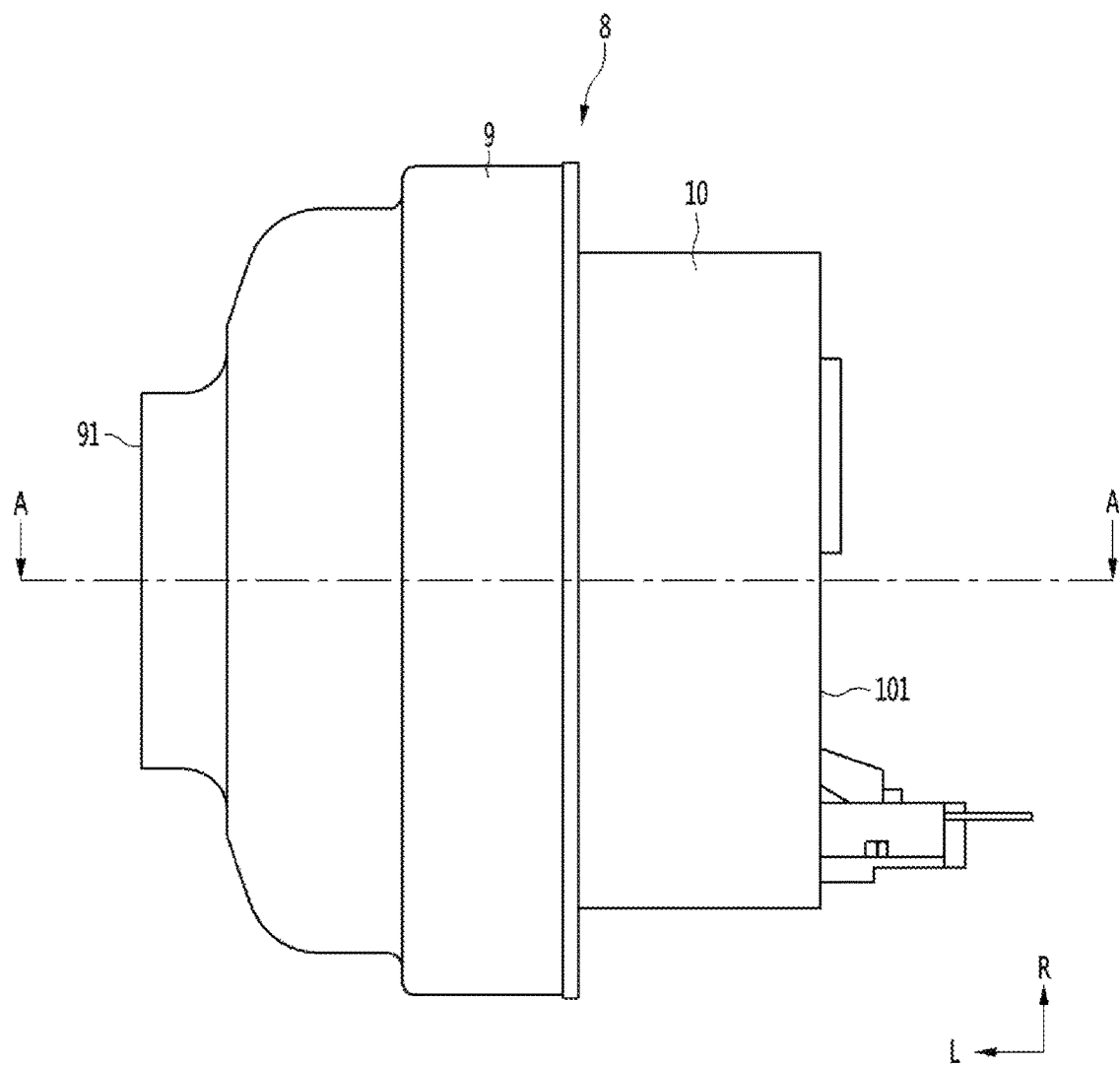
FIG. 1 is a side view of a motor according to an embodiment of the present invention.
Figure 2:
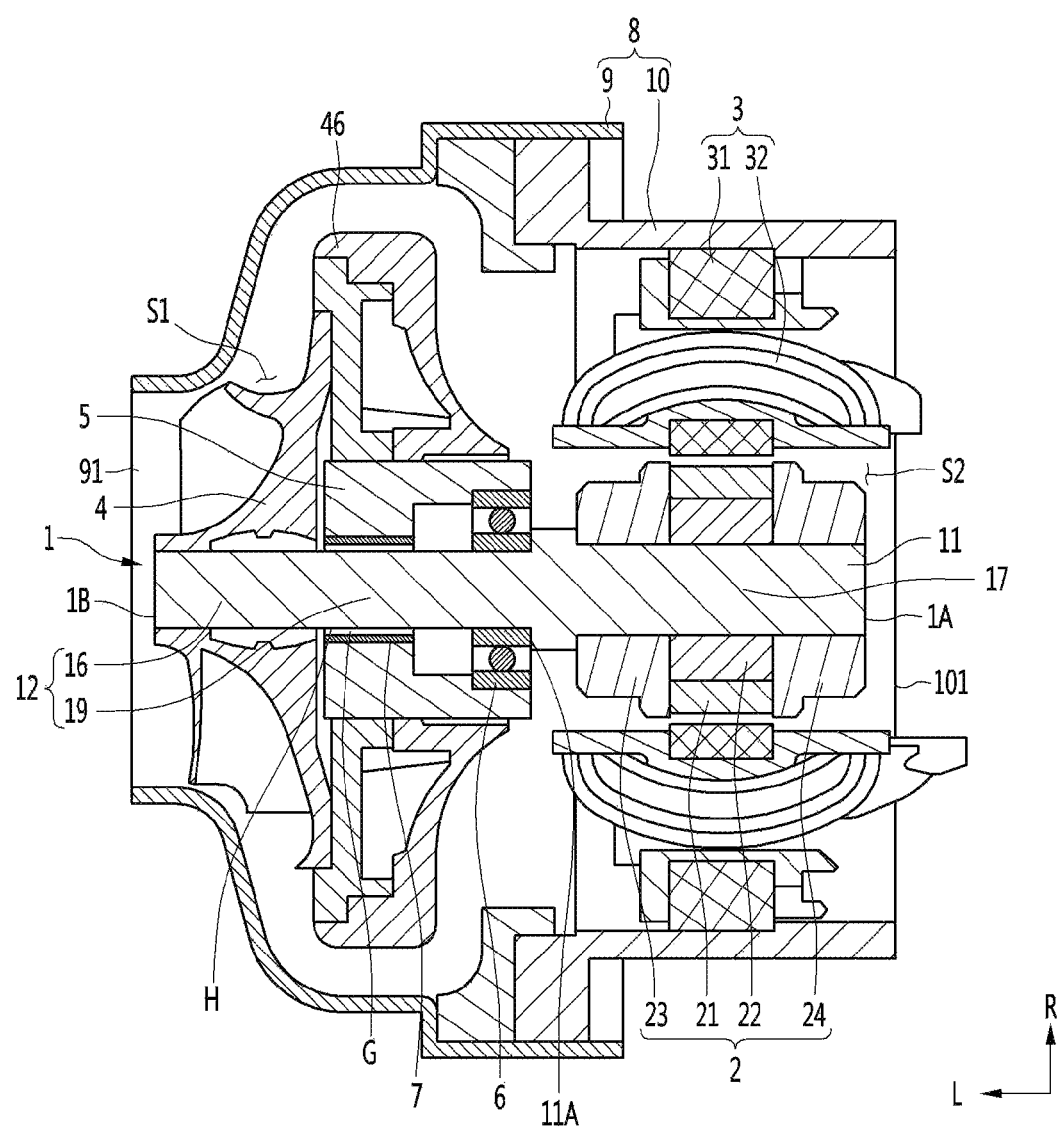
FIG. 2 is a cross-sectional view of the motor according to an embodiment of the present invention.
Figure 3:
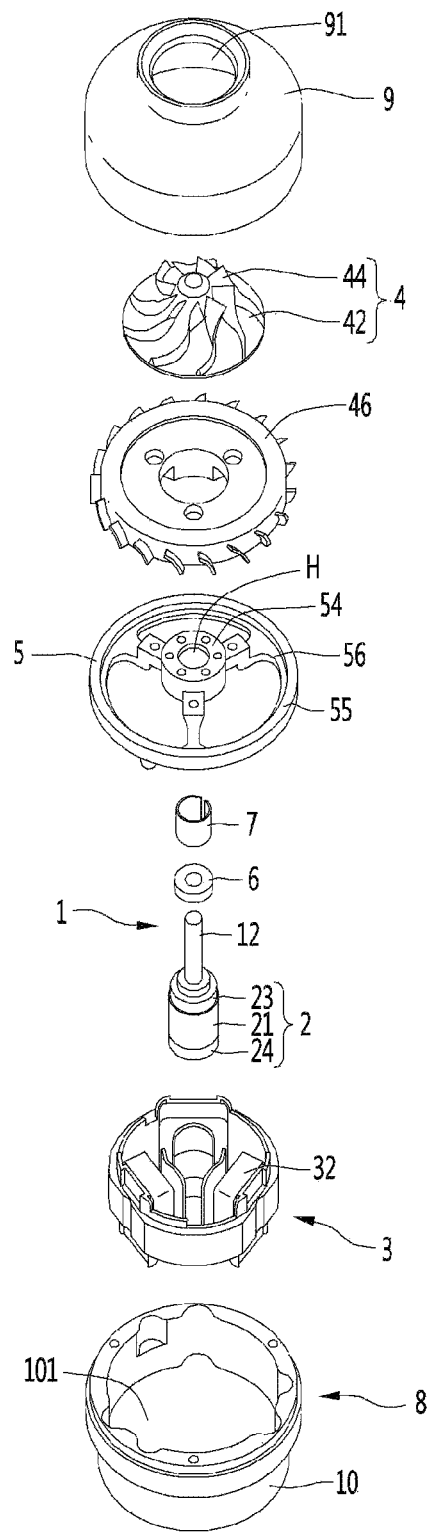
FIG. 3 is an exploded perspective view of the motor according to an embodiment of the present invention.
Figure 4:
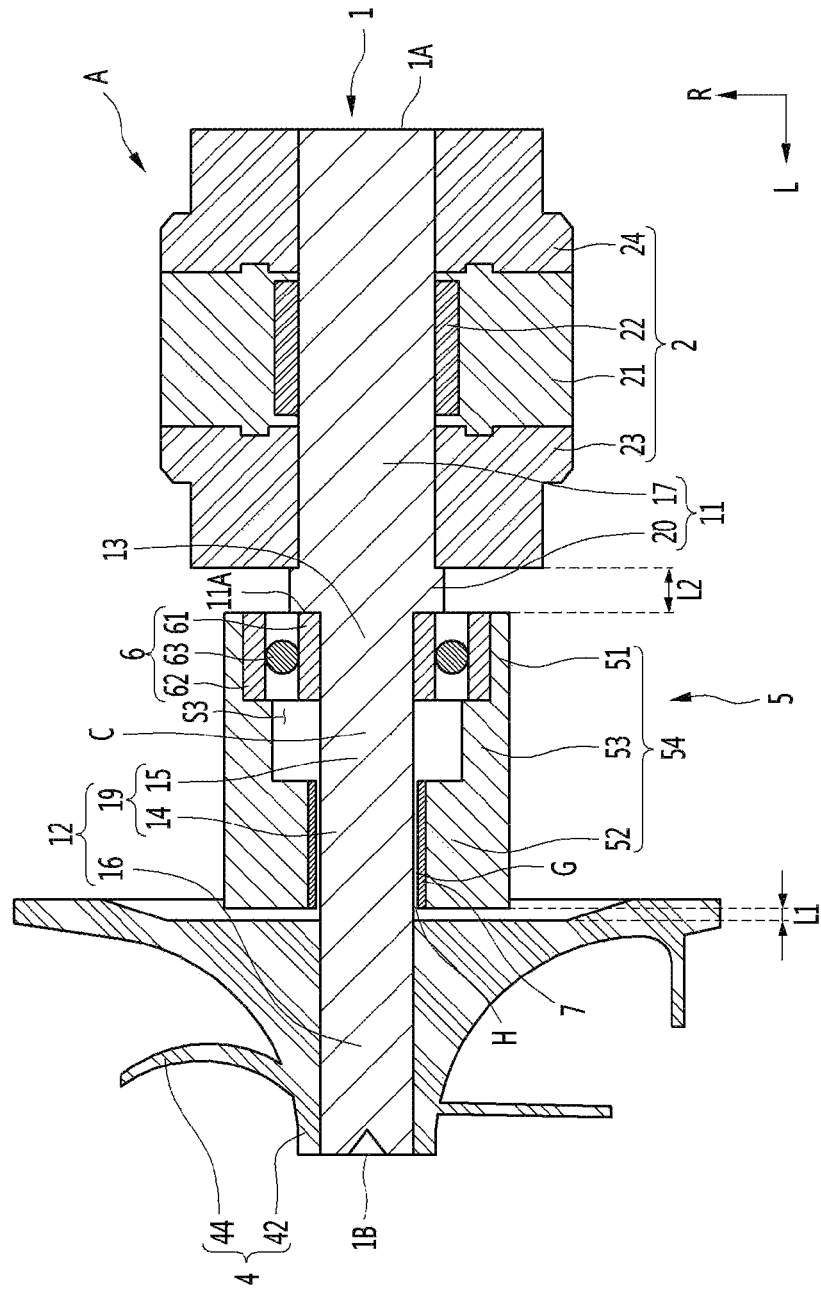
FIG. 4 is a cross-sectional view of a rotor assembly according to an embodiment of the present invention.
Figure 5:
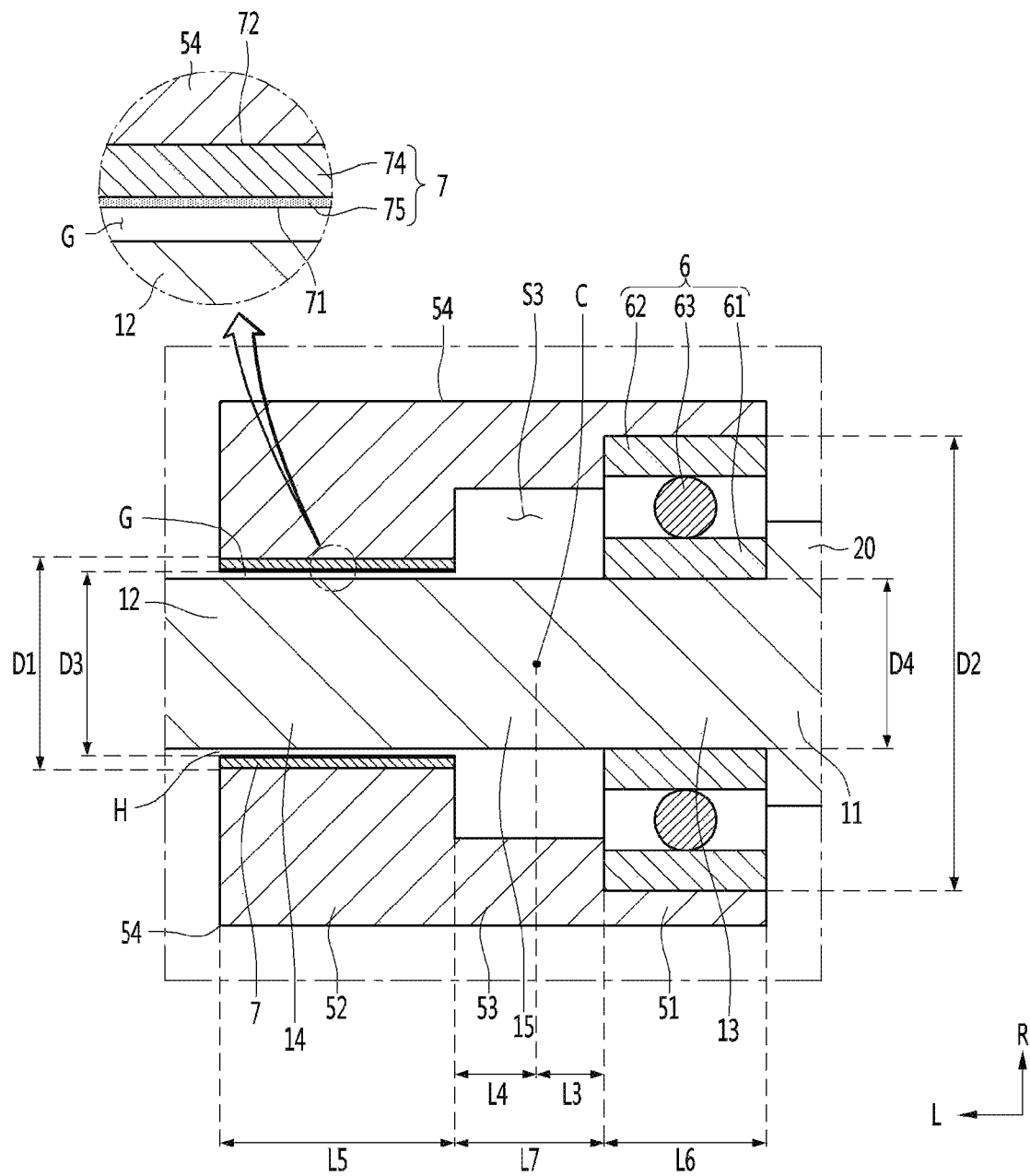
FIG. 5 is an enlarged cross-sectional view of a rolling bearing, a gas bearing, and a bearing housing according to an embodiment of the present invention.
Figure 6:
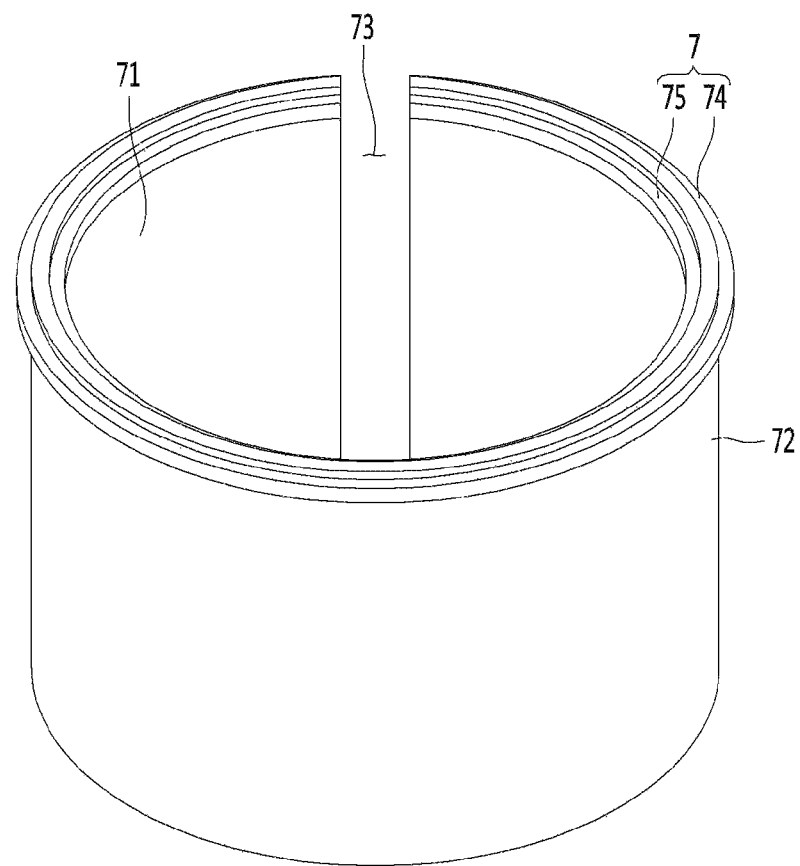
FIG. 6 is an enlarged perspective view of the gas bearing according to an embodiment of the present invention.

FIG. 1 is a side view of a motor according to an embodiment of the present invention, FIG. 2 is a cross-sectional view of the motor according to an embodiment of the present invention, FIG. 3 is an exploded perspective view of the motor according to an embodiment of the present invention, FIG. 4 is a cross-sectional view of a rotor assembly according to an embodiment of the present invention, FIG. 5 is an enlarged cross-sectional view of a rolling bearing, a gas bearing, and a bearing housing according to an embodiment of the present invention, and FIG. 6 is an enlarged perspective view of the gas bearing according to an embodiment of the present invention.

The motor includes a rotary shaft 1, a rotor 2, a stator 3, an impeller 4, a bearing housing 5, a rolling bearing 6, and a gas bearing 7. The motor may further include a motor body 8 defining an outer appearance thereof.

An impeller space S1 in which the impeller 4 is accommodated may be defined in the motor body 8. Also, a motor space S2 in which the rotor 2 and the stator 3 are accommodated may be defined in the motor body 8.

A suction hole 91 through which air is suctioned into the impeller space S1 may be defined in the motor body 8. Also, a discharge hole 101 through which the air in the motor space S2 is discharged to the outside of the motor may be defined in the motor body 8.

The motor body 8 may be provided as a single member or may be provided as a combination of a plurality of members.

When the motor body 8 is the combination of the plurality of members, the motor body 8 may include an inlet body 9 and a motor housing 10.

A suction hole 91 through which air is suctioned may be defined in the inlet body 9. The inlet body 9 may be disposed to surround an outer circumference of the impeller 4. The impeller space S1 in which the impeller 4 is rotatably accommodated may be defined in the inlet body 9.

The inlet body 9 may be coupled to the motor housing 10 that is disposed at a side opposite to the inlet 91. The inlet body 9 may surround the whole or a portion of an outer circumference of the motor housing 10.

The motor housing 10 may surround an outer circumference of the stator 3. The motor space S2 into which the rotary shaft 1, the rotor 2, and the stator 3 are accommodated may be defined in the motor housing 10. The discharge hole 101 through which the air introduced into the motor space S2 after flowing by the impeller 4 is discharged to the outside of the motor body 8 may be defined in the motor housing 10. The discharge hole 101 may be defined in a side opposite to the suction hole 91.

The motor housing 10 may have a hollow shape. In the motor according to this embodiment, the rotary shaft 1 may not be supported by the motor housing 10, and the motor housing 10 may not include a separate rotary shaft supporter for supporting the rotary shaft 1.

The rotary shaft 1 may be disposed to lengthily extend from the motor space S2 to the impeller space S1. One end 1A of the rotary shaft 1 may be disposed in the motor space S2, and the other end 1B of the rotary shaft 1 may be disposed in the impeller space S2.

Each of the one end 1A of the rotary shaft 1 and the other end 1B of the rotary shaft 1 may be a free end that is not supported by the motor body 8 and the bearing housing 5. The rotary shaft 1 may be supported by a plurality of bearings 6 and 7 between the one end 1A and the other end 1B.

The one end 1A of the rotary shaft 1 may be close to the rotor 2 of the rotor 2 and the impeller 4 and may be a rotor-side free end.

The other end 1B of the rotary shaft 1 may be closer to the impeller 4 of the rotor 2 and the impeller 4 and may be an impeller-side free end.

Referring to FIG. 2, the rotary shaft 1 may include an impeller coupling portion 16 to which the impeller 4 is coupled and a rotor coupling portion 17 to which the rotor 2 is coupled. In addition, the rotary shaft 1 may further include a supporter (see FIG. 2) supported by the plurality of bearings 6 and 7. The supporter 19 may be disposed between the rotor coupling portion 17 and the impeller coupling portion 16. The rotary shaft 1 may be configured to be disposed in order of the rotor coupling portion 17, the supporter 19, and the impeller coupling portion 16 in the axial direction L.

The impeller coupling portion 16 and the supporter 19 may constitute a small diameter part 12 that will be described below. Also, the rotor coupling portion 17 may include a large diameter part 11 that will be described below.

The rotary shaft 1 may include the large diameter part 11 and the small diameter part 12. The large diameter part 11 and the small diameter part 12 may be continuous in the axial direction. The small diameter part 12 may be a portion having a diameter less than that of the large diameter part 11.

The large diameter part 11 may be a portion on which the rotor 2 is mounted, and the outer diameter of the large diameter part 11 may be greater than the outer diameter of the small diameter part 12. The large diameter part 11 may include the one end 1A of the rotary shaft 1. The large diameter part 11 may be disposed in the motor space S2.

The outer diameter of the one end 11A of the large diameter part 11 in the axial direction may be greater than the inner diameter of the inner ring 61 of the rolling bearing 6. In this case, the inner ring 61 of the rolling bearing 6 may be hooked with the one end 11A of the large diameter part 11 in the axial direction L. The one end 11A of the large diameter part 11 in the axial direction may contact the inner ring 61 of the rolling bearing 6, and the rolling bearing 6 may be hooked with the one end 11A of the large diameter part 11 in the axial direction so as not to be slid toward the rotor 2.

The large diameter part 11 may include a rotor coupling portion 17 to which the rotor 2 is coupled. An outer circumferential surface of the rotor coupling portion 17 may be surrounded by the rotor 2. The rotor coupling portion 17 may include one end 1A of the rotary shaft 1.

The large diameter part 11 may further include a spacer 20 spacing the rolling bearing 6 from the rotor 2. The spacer 20 may include the end portion 11A of the large diameter part 11 in the axial direction. The spacer 20 may have an outer diameter having a stepped portion with respect to the small diameter part 12. The spacer 20 may have an outer diameter having a stepped portion with respect to the rotor coupling portion 17.

The spacer 20 may include a hook protrusion with which the inner ring 61 of the rolling bearing 6 is axially hooked, and the hook protrusion may protrude to be disposed between the inner ring 61 of the rolling bearing 6 and the rotor 2.

The small diameter part 12 may extend from the end portion 11A in the axial direction of the large diameter part 11 in the axial direction. The small diameter part 12 may pass through a through-hole H of the bearing housing 5.

The small diameter part 12 may be a portion on which the impeller 4 and the rolling bearing 6 are mounted. The small diameter part 12 may include the other end 1B of the rotary shaft 1. A portion of the small diameter part 12 may be disposed in the motor space S1, and the remaining portion of the small diameter part 12 may be disposed in the impeller space S1.

The small diameter part 12 may face each of the rolling bearing 6 and the gas bearing 7 in a radial direction R.

As illustrated in FIG. 5, the small diameter part 12 may include an inner ring contact portion 13 contacting the inner ring 61 of the rolling bearing 6 and a gas bearing facing portion facing the gas bearing in the radial direction R. In this case, an outer diameter D4 of the inner ring contact portion 13 and an outer diameter D4 of the gas bearing facing portion 14 may be the same.

When the inner ring contact portion 13 and the gas bearing facing portion 14 have a stepped portion, a manufacturing process of the rotary shaft 1 may be complicated. On the other hand, when the outer diameter D4 of the inner ring contact portion 13 and the outer diameter D4 of the gas bearing facing portion are the same, the manufacturing process o the rotary shaft may be simple.

As shown in FIG. 4, the small diameter part 12 may further include a connector facing portion 15 that faces a connector 53, which will be described later, of the bearing housing 5 in the radial direction R. An empty space S3 may be defined between an outer circumferential surface of the connector facing portion 15 and an inner circumferential surface of the connector 53. The empty space S3 may function as a passage for air introduced and discharged between the inner circumferential surface of the gas bearing 7 and the outer circumferential surface of the rotary shaft 1.

As illustrated in FIG. 4, the small diameter part 12 may further include an impeller coupling portion 16 to which the impeller 4 is coupled.

The small diameter part 12 may have a constant outer diameter from the inner ring contact portion 13 to the impeller coupling portion 16. In this case, the manufacturing process of the rotary shaft 1 may be simple.

The inner ring contact portion 13, the connector facing portion 15, and the gas bearing facing portion 14 may constitute the supporter 19. That is, the small diameter part 12 may include an impeller connector 16 and the supporter 19, and the supporter 19 may have the inner ring contact portion 13, the connector facing portion 14, and the gas bearing facing portion 14, which are disposed in line in the axial direction L.

The small diameter part 12 may have a constant outer diameter of the bearing supporter 19. In this case, the manufacturing process of the rotary shaft 1 may be simple.

The rotor 2 may be mounted to the rotary shaft 1. The rotor 2 may be disposed to surround the outer circumference of the rotary shaft 1. The rotor 2 may be mounted at a portion of the rotary shaft 1, which is accommodated in the motor space S2.

The rotor 2 may be spaced apart from the rolling bearing 6 in the axial direction L.

The rotor 2 may include a magnet 21. The rotor 2 may further include a magnet core 22 on which the magnet 21 is mounted. The rotor 2 may further include a pair of end plates 23 and 24, which are spaced apart from each other in the axial direction L.

The rotor 2 may constitute the rotor assembly A together with the rotary shaft 1, the impeller 4, and the rolling bearing 6. The rotor 2 may be heavier than the impeller 4. A center of gravity of this rotor assembly A may be closer to the rotor 2 of the impeller 4 and the rotor 2.

The stator 3 may be disposed on the inner circumference of the motor body 8. The stator 3 may be disposed on the inner circumference of the motor housing 10. The stator 3 may include a stator core 31 and a coil 32 wound around the stator core.

The impeller 4 may be mounted on the rotary shaft 1. The impeller 4 may be mounted to be spaced apart from the rotor 2. The impeller 4 may be spaced apart from the rotor 2 in the axial direction L. The impeller 4 may be made of a lighter material than the rotor 2 and may be made of a high strength synthetic resin material such as PEEK.

The impeller 4 may be a centrifugal impeller that suctions a gas such as air in the axial direction L and then discharges the gas in the centrifugal direction R. The impeller 4 may include a hub 42 and a plurality of blades 44 disposed on an outer circumference of the hub 42.

The motor may further include a diffuser 46 (see FIGS. 2 and 3) for guiding the air flowing in the impeller 4. The diffuser 46 may be disposed inside the motor body 8, in particular the inlet body 9, and an outer circumference of the diffuser 46 may face an inner circumferential surface of the motor body 8, in particular the inlet body 9.

A path guiding the gas such as air flowing by the impeller 4 into the motor space S2 may be provided between the diffuser 46 and the inlet body 9.

The bearing housing 5 may be disposed between the impeller 4 and the rotor 2. The bearing housing 5 may have a through-hole H through which the rotary shaft 1 passes. The bearing housing 5 may surround an outer circumference of a portion of the rotary shaft 1 (i.e., the supporter 19). The bearing housing 5 may surround a portion of the small diameter part 12 of the rotary shaft 1. A minimum inner diameter of the bearing housing 5 may be greater than the outer diameter of the small diameter part 12.

The bearing housing 5 may be integrated with the motor body 1 or may be manufactured separately from the motor body 1 and then coupled to the motor body 1. When the bearing housing 5 is integrated with the motor body 1, an assembly tolerance may be minimized.

When the bearing housing 5 is manufactured separately from the motor body 1, the bearing housing 5 may be coupled to the motor body 8, in particular the inlet body 9 or the motor housing 10 by using a coupling member such as a screw.

The bearing housing 5 may include a housing portion 54 (see FIGS. 3 to 5) to support the plurality of bearings 6 and 7, which are spaced apart from each other. The bearing housing 5 may further include the coupling portion 55 (see FIG. 3) that is coupled to the motor body 1. The bearing housing 5 may further include a plurality of bridge portions 56 (see FIG. 3) connecting the housing portion 54 to the coupling portion 55.

The through-hole H through which the rotary shaft 1 passes may be defined in the housing portion 54. A bearing space in which the plurality of bearings 6 and 7 may be accommodated may be defined in the housing portion 54.

The motor may include a contact bearing constant contacting the rotary shaft 1 and a non-contact bearing that does not constant contact the rotary shaft 1, and the contact bearing and the non-contact bearing may support the rotary shaft 1 through a combination thereof.

The bearing housing 5 may support the rolling bearing 6 and the gas bearing 7, and the rolling bearing 6 and the gas bearing 7 may rotatably support the rotary shaft 1 while being supported by the bearing housing 5.

The rolling bearing 6 may be an example of the contact bearing. The rolling bearing 6 may be a bearing capable of supporting the rotary shaft 1 in two directions, i.e., the axial direction L and the radial direction R.

In this embodiment, the rotary shaft 1 may be supported by the combination of the rolling bearing 6 and the gas bearing 7. In this embodiment, when two rolling bearings 6 support the rotary shaft 1, resistance may be reduced, and the rotary shaft 1 rotating at a high speed may be more stably supported.

The gas bearing 7 may be an example of the non-contact bearing. The higher a rotational speed of the rotary shaft 1, the higher a bearing capacity of the gas bearing 7. As described in this embodiment, if at least one of the plurality of bearings is the gas bearing 7, the rotary shaft 1 rotating at the high speed may be more stably supported when compared to a case in which all of the plurality of bearings are rolling bears.

The gas bearing 7 may be a thrust gas bearing that supports the rotary shaft 1 in the axial direction L, or a radial gas bearing (e.g., journal gas bearing) that supports the rotary shaft 1 in the radial direction R. When two gas bearings are installed in the motor, i.e., the gas radial bearing and the gas thrust bearing, respectively, a length of the rotary shaft 1 and a total length of the motor may increase.

It is preferable that the motor includes the minimum number of gas bearings 7 for lightweight and miniaturization.

Since the rolling bearing 6 is a motor which supports the rotary shaft 1 in the two directions of the axial direction L and the radial direction R, in this embodiment, the rotary shaft 1 may be stably supported by the rolling bearing 6 and the radial gas bearing 7.

The motor may be a high speed motor in which the rotary shaft 1 rotates at a high speed of 10,000 RPM or more. As described above, when the rotary shaft 1 may rotate by the combination of the rolling bearing 6 and the radial gas bearing 7, the motor may stably support the rotary shaft 1.

The rolling bearing 6 may support an axial load and a radial load of the rotary shaft 1 in a state of constantly contacting the rotary shaft 1, and the radial gas bearing 7 may support radial loads of the rotary shaft 1 together with the rolling bearing 6 in a state of being spaced apart from the rotary shaft 1.

Instead of the combination of the radial gas bearing 7 and the rolling bearing 6, a combination of the thruster gas bearing 7 and the rolling bearing 6 may be also possible. However, in this case, the outer diameter and size of the motor may increase. Also, the combination of the radial gas bearing 7 and the rolling bearing 6 may be preferable for compactness of the motor.

When the motor is a high speed motor in which the rotary shaft 1 rotates at a high speed of 10,000 RPM or more, ability to support the load in the radial direction may be more important than the ability to support the load in the axial direction. In the case of the high speed motor capable of rotating at a high speed of 10,000 RPM or more, it may be most preferable to support the rotary shaft 1 by the combination of the radial gas bearing 7 and the rolling bearing 6.

The motor may support a portion between the rotor 2 and the impeller 3 among the gas bearing 7 which is an example of the non-contact bearing and the rolling bearing 6 which is an example of the contact bearing. In this case, the rolling bearing 6 and the gas bearing 7 may be mounted together in the bearing housing 5, and the number of components of the motor may be minimized.

The bearing housing 5 may include a rolling bearing housing portion 51 and a gas bearing housing portion 52.

The rolling bearing housing portion 51 may surround the outer circumferential surface of the rolling bearing 6 and may support and protect the rolling bearing 6. The rolling bearing housing portion 51 may face the rotor 2 in the axial direction L.

The outer ring 62 of the rolling bearing 6 may be press-fitted into an inner circumferential surface of the rolling bearing housing portion 51 and then closely attached to the rolling bearing housing portion 51 and also be fixed to the inner circumferential surface of the rolling bearing housing portion 51.

The gas bearing housing portion 52 may surround the outer circumferential surface of the gas bearing 7 and may support and protect the gas bearing 7. The gas bearing housing portion 52 may face the impeller 4 in the axial direction L. The gas bearing housing portion 52 may be spaced apart from the impeller 4 in the axial direction L, and a gap through which the gas such as air is introduced into and discharged from the inside of the gas bearing housing portion 52 may be defined between the gas bearing housing portion 52 and the impeller 4. The gap may communicate with the bearing clearance G in the axial direction L between the gas bearing 7 and the rotary shaft 1.

In the bearing housing 5, a first hook protrusion with which one end of the gas bearing 7 in the axial direction is hooked may protrude, and a second hook protrusion with which the other end of the gas bearing 7 in the axial direction may protrude.

The first hook protrusion and the second hook protrusion may protrude with a width that is enough so as not to worn by the rotary shaft 1 and may protrude with a width that is not in contact with the rotary shaft 1. The protruding width of each of the first hook protrusion and the second hook protrusion may be thinner than the thickness of the gas bearing 7. In this case, the outer circumferential surface of the rotary shaft 1 may be in contact with the coating layer 75 of the gas bearing 7, and the wear of the rotary shaft 1 in contact with the first and second hook protrusions may be minimized.

The protruding width of each of the first hook protrusion and the second hook protrusion may be 50% to 90% of the thickness of the gas bearing 7. If the protruding width of each of the first hook protrusion and the second hook protrusion is too small, the gas bearing 7 may be easily separated to the outside of the bearing housing 5 while passing over one of the first hook protrusion and the second hook protrusion.

On the other hand, when the protruding width of each of the first hook protrusion and the second hook protrusion is 50% to 90% of the thickness of the gas bearing, the gas bearing 7 may be stably supported and maintained in the axial direction L between the first hook protrusion and the second hook protrusion.

The gas bearing housing portion 52 may have an inner diameter less than that of the rolling bearing housing portion 51. The size of the gas bearing housing portion 52 is preferably less than that of the rolling bearing 6, and the inner diameter of the gas bearing housing portion 52 may be less than the inner diameter of the rolling bearing housing portion 51.

The bearing housing 5 may further include a connector 53. The connector 53 may be disposed to connect the rolling bearing housing portion 51 to the gas bearing housing portion 52.

The rolling bearing 6 and the gas bearing 7 may be spaced apart from each other in the axial direction L, and the rolling bearing housing portion 51 and the gas bearing housing portion 52 may also be spaced apart from each other. Also, the connector 53 may connect the bearing housing portion 51 to the gas bearing housing portion 52 between the rolling bearing housing portion 51 and the gas bearing housing portion 52.

The connector 53 may be disposed so that the outer ring 62 of the rolling bearing 6 is hooked in the axial direction L. An inner diameter of the connector 53 may be less than the outer diameter of the outer ring 62 of the rolling bearing 6. An inner diameter of the connector 53 may be less than the inner diameter of the rolling bearing housing portion 51 and greater than the inner diameter of the gas bearing housing portion 52.

An empty space S3 may be defined between the inner circumference of the connector 53 and the outer circumferential surface of the rotary shaft 1. The empty space S3 may communicate with the bearing clearance G in the axial direction L between the gas bearing 7 and the rotary shaft 1.

The rolling bearing housing portion 51, the gas bearing housing portion 52, and the connector 53 may constitute the housing portion 54 which supports the plurality of bearing 6 and 7 to be spaced apart from each other.

A separate air path for guiding a portion of the air flowing by the impeller 4 to the bearing clearance G may be defined in the housing portion 54. One example of the air path may be defined to allow the outside of the housing portion 54 to communicate with the space S3 of the connector 53 or allow the outside of the housing portion 54 to communicate with the inside of the gas bearing housing portion 52.

The rolling bearing 6 and the gas bearing 7 may be disposed in the bearing housing 5. The rolling bearing 6 and the gas bearing 7 may be disposed in the bearing housing 5 so as to be spaced apart from each other in the axial direction L.

The rolling bearing 6 may be disposed between the gas bearing 7 and the rotor 2 in the axial direction L and may be spaced apart from each of the gas bearing 7 and the rotor 2.

The gas bearing 7 may be disposed between the rolling bearing 6 and the impeller 4 in the axial direction L and may be spaced apart from each of the rolling bearing 6 and the impeller 4.

The rotor 2, the impeller 4, the rolling bearing 6, and the gas bearing 7 may be disposed in order of the rotor 2, the rolling bearing 6, the gas bearing 7, and the impeller 4 in the axial direction L.

The rolling bearing 6 may include an inner ring 61 fixed to the rotary shaft 1, an outer ring 62, and a rolling member 63.

The rolling bearing 6 may be a contact bearing supporting the rotary shaft 1 in constant contact with the rotary shaft 1, and when the rotary shaft 1 rotates at a low speed, the load bearing capacity is greater than that of the gas bearing 7.

When the rotor 2 and the impeller 4 are mounted to the rotary shaft 1, the rotary shaft 1, the rotor 2, and the impeller may constitute the rotor assembly A (see FIG. 4), and the rotary shaft 1, the rotor 2, and the impeller 4 may rotate together.

The rotor 2 may be heavier than the impeller 4. In this case, the center of gravity C of the rotor assembly A may be closer to the rotor 3 than the impeller 4.

It is preferable that the motor has a higher load supporting capacity among the gas bearing 7 and the rolling bearing 6 and be disposed closer to the rotor 2 than the bearing which is in constant contact with the rotary shaft 1. That is, the motor may be preferably provided so that the rolling bearing 6 is closer to the rotor 2 than the gas bearing 7. In this case, the rolling bearing 6 and the gas bearing 7 may more stably support the rotor assembly A.

The rolling bearing 6 may be closer to the rotor 2 of the rotor 2 and the impeller 4. A distance L2 between the rolling bearing 6 and the rotor 2 may be less than a distance between the rolling bearing 6 and the impeller 4.

Each of the rolling bearing 6 and the gas bearing 7 preferably supports the rotor assembly A at a position close to the center of gravity C of the rotor assembly A. In this case, the rotor assembly A may be more stably supported.

The rolling bearing 6 preferably supports a portion at which the center of gravity C of the rotor assembly A is disposed, or supports a portion near the portion at which the center of gravity C of the rotor assembly A is disposed.

The rolling bearing 6 preferably contacts a portion disposed between the portion at which the center of gravity C of the rotor assembly A is disposed and the rotor coupling portion 17.

The distance L3 between the center of gravity C of the rotor assembly A and the rolling bearing 7 may be less than a distance L4 between the center of gravity C of the rotor assembly A and the gas bearing 7.

The center of gravity C of the rotor assembly A is preferably disposed at the supporter 19 (see FIG. 2) and may be a portion disposed between the inner ring contact portion 13 and the gas bearing facing portion 14 of the rotary shaft 1 (i.e., the connector facing portion 15) or the inner ring contacts 13.

In one example of the motor, the distance L3 between the center of gravity C of the rotor assembly A and the inner ring contact portion 13 may be less than the distance L4 between the center of gravity C of the rotor assembly A and the gas bearing facing portion 14. In this case, the rolling bearing 6 may be disposed closer to the center of gravity C of the rotor assembly A than to the gas bearing 7.

In another example of the motor, the distance L3 between the center of gravity C of the rotor assembly A and the inner ring contact portion 13 may be equal to the distance L4 between the center of gravity C of the rotor assembly A and the gas bearing facing portion 14. In this case, the rolling bearing 6 and the gas bearing 7 may support the rotary shaft 1 in a state of being spaced the same distance from the center of gravity C of the rotor assembly A.

The rolling bearing 6 may be hooked with one end 11A of the large diameter part 11 in the axial direction L. The inner ring 61 of the rolling bearing 6 may be hooked to contact the one end 11A of the large diameter part 11.

The gas bearing 7 may be closer to the impeller 4 of the rotor 2 and the impeller 4. The gas bearing 7 may be closer to the impeller 4 of the rolling bearing 6 and the impeller 4. Referring to FIG. 4, the axial distance L1 between the gas bearing 7 and the impeller 4 may be less than the axial distance L2 between the rolling bearing 6 and the rotor 2. Also, referring to FIG. 4, the gas bearing 7 may face a portion between the center of gravity C of the rotor assembly A and the impeller coupling portion 16.

The gas bearing 7 may be an oilless bearing. The gas bearing 7 may be a bearing having a low friction coating layer having excellent lubricity and wear resistance. The low friction coating layer may be disposed on the inner circumference of the gas bearing 7.

The gas such as air may support the rotary shaft 1 between the low friction coating layer of the gas bearing 7 and the outer circumferential surface of the rotary shaft 1.

The gas bearing 7 may be a dynamic pressure gas bearing and may support the rotary shaft 1 by the gas such as air introduced between the inner circumferential surface of the gas bearing 7 and the rotary shaft 1 around the gas bearing 7.

When the rotary shaft 1 rotates, a velocity component of an air flow may be generated on the outer circumference of the rotary shaft 1, and the rotary shaft 1 may be eccentric toward one side of the gas bearing 7 among inner portions of the gas bearing 7. When the rotary shaft 1 is eccentric, a gap narrower than the bearing clearance when the rotary shaft 1 is not eccentric may be defined between the rotary shaft 1 and the gas bearing 7 and may be disposed inside the gas bearing 7. The gas such as air may be suctioned toward the narrow gap, and the air outside the gas bearing 7 may be suctioned between the gas bearing 7 and the rotary shaft 1.

The gas bearing 7 may have an inner surface 71 spaced apart from the outer circumferential surface of the rotary shaft and an outer surface 72 contacting the gas bearing housing portion 52 disposed in the bearing housing 5.

The gas bearing 7 may have a long slit 73 (see FIG. 6) defined in one side in the axial direction L. The slit 73 may be opened radially to the gas bearing 7.

The gas bearing 7 may be manufactured by rolling a metal plate body that is thinner than the thickness of the rolling bearing 6 in a right arc shape or a ring shape in a cross-sectional shape. In the state of being rolled in the right arc shape or ring shape, the gas bearing 7 may be inserted into the gas bearing housing part 52.

As described above, when the gas bearing 7 is manufactured by rolling the metal plate body, it may be easy to manage thickness distribution of the gas bearing 7. When the outer circumferential surface of the rotary shaft 1 and the inner circumferential surface of the bearing housing 5 are precisely processed, the bearing clearance G between the rotary shaft 1 and the gas bearing 7 may be managed to the level desired by a manufacturer.

The gas bearing 7 may include a bush 74 in which the slit 73 is defined and a coating layer 75 applied to an inner surface of the bush 74.

The coating layer 75 may be made of polytetrafluoroethylene (PTFE), diamond like carbon (DLC), lubrite, Mos2, D10, boron nitride, ceramic powder, a soft metal such as soap or copper or lead.

The inner surface 71 of the gas bearing 7 may be a surface of the coating layer 75, which faces the outer circumferential surface of the rotary shaft 1, and the outer surface 72 of the gas bearing 7 may be a surface of the bush 74, which faces the inner circumferential surface of the bearing housing 5.

The coating layer 75 may be applied to one surface of the metal plate when the gas bearing 7 is in a metal plate body state before being rolled in the right arc shape or the ring shape. In this case, uniformity of the thickness of the coating layer 75 may be high, and the gas bearing 7 may facilitate the thickness distribution management as a whole.

One example of the method for manufacturing the motor includes a process of applying a coating layer 75 to one surface of a metal thin film having a plate shape; a process of manufacturing a bush 74 on which a coating layer 75 is formed by rolling the metal thin film in an arc shape so that one surface of the metal thin film to which the coating layer 75 is applied is positioned inside; a process of inserting a gas bearing 7 into the bearing housing 5; and a process of allowing the rotary shaft 1 to pass through the inside of the gas bearing 7.

The bush 74 may be made of a nickel chromium alloy having a nickel content greater than the chromium content. The bush 74 may be a bush in which the slit 73 is defined in one side, and the gas bearing 7 may be a non-contact bush bearing.

The coating layer 75 may be applied to one surface of the metal plate when the bush 74 is in a plate body state before being rolled in the right arc shape or the ring shape. In this case, uniformity of the thickness of the coating layer 75 may be high, and the gas bearing 7 may facilitate the thickness distribution management as a whole.

The gas bearing 7 may be a bearing lubricated by a gas disposed in the bearing clearance G, in particular air, and may be a non-contact oilless bearing that supports the rotary shaft 1 in a non-contact state with the rotary shaft 1.

The gas bearing 7 may face a position eccentrically toward a side of the impeller 4 from the center of the rotary shaft 1. The gas bearing 7 may be closer to the impeller 4 of the rotor 2 and the impeller 4. The gas bearing 7 may be closer to the impeller 4 of the rolling bearing 6 and the impeller 4. The axial distance L1 between the gas bearing 7 and the impeller 4 may be less than the axial distance L2 between the rolling bearing 6 and the rotor 2. The gas bearing 7 may face a portion between the center of gravity of the rotary shaft 1 and the other end 1B of the rotary shaft 1. The gas bearing 7 may face a portion between the center of gravity of the rotary shaft 1 and the impeller connector 16.

When the impeller 4 rotates at a high speed, a portion of the air flowing by the impeller 4 may be introduced into the bearing clearance G from the surrounding of the bearing housing 5.

When the impeller 4 rotate at the high speed, the air around the bearing housing 5 may be introduced into the bearing housing 5, in particular, the bearing clearance G between the inner surface of the gas bearing 7 and the outer circumferential surface of the rotary shaft 1, and the air within the bearing clearance G may float the rotary shaft 1.

The gas bearing 7 may have an inner surface 71 spaced apart from the outer circumferential surface of the rotary shaft 1 and an outer surface 72 contacting the gas bearing housing portion 52 disposed in the bearing housing 5.

The gas bearing 7 is preferably manufactured in a shape and thickness, which are capable of constantly maintaining the bearing clearance G and preferably has elastic force capable of maintaining the shape when mounted on the bearing housing 5.

The thickness of the gas bearing 7 is 50% or more of the gap between the inner surface of the bearing housing 5 and the outer surface of the rotary shaft 1 and is 0.3 mm or less.

If the thickness of the seal bearing 7 is too thick, the thickness distribution of the gas bearing 7 may be large, and the bearing clearance G may not be constant, and the deviation may be large.

The optimum bearing clearance G of the gas bearing 7 may differ depending on the outer diameter of the gas bearing facing portion 14, and the gas bearing 7 of the gas bearing 7 for the gas bearing 7 to sufficiently perform the gas bearing function. The thickness may be 0.004 times to 0.0125 times the outer diameter of the gas bearing facing portion 14. When the outer diameter of the gas bearing facing portion 14 of the rotary shaft 1 is 4 mm to 5 mm, the bearing clearance G may be 0.02 mm to 0.05 mm.

The gas bearing 7 is preferably manufactured to a thickness capable of securing the bearing clearance G.

Typically, the thickness distribution of the gas bearing 7 having a thickness of less than 1 mm is within about 3%. If the thickness of the gas bearing 7 is too thick, the thickness may exceed 0.3 mm, the thickness distribution of the gas bearing may be about 0.01 mm. 0.01 mm, which is the thickness distribution, may correspond to 20% to 50% of the bearing clearance G, and a performance deviation of the gas bearing 7 may be severe.

In addition, if the thickness of the gas bearing 7 is more than 0.3 mm, when the gas bearing 7 is bent to insert the inside of the bearing housing 5, plastic deformation may occur so that the gas bearing is not closely attached to the inner surface of the bearing housing 5 but contacts the outer circumferential surface of the rotary shaft 1, and thus, the portion of the gas bearing 7, at which the plastic deformation occurs, may not serve as the gas bearing.

On the other hand, if the thickness of the gas bearing 7 is 50% or more of the gap G1 between the inner surface of the bearing housing 5 and the outer circumferential surface of the rotary shaft 1, when the gas bearing 7 may be mounted on the bearing housing 5, one portion of the gas bearing 7 may not overlap the other portion, and the entire gas bearing 7 may be maintained to be attached as closely as possible to minimize an error of the bearing clearance G.

In addition, when the thickness of the gas bearing 7 is too thin (0.1 mm or less), manufacturing may not be easy.

For this, an appropriate thickness of the gas bearing 7 may be 0.3 mm, and the preferred appropriate range may be 0.1 mm or more and 0.3 mm or less.

That is, the gas bearing 7 may be manufactured by rolling a thin metal plate having a plate-like shape having a thickness of 0.3 mm or less in the right arc shape or the ring shape and be inserted into the bearing housing 5 while being accommodated in the right arc shape or the ring shape.

Referring to FIG. 5, the outer diameter D1 of the gas bearing 7 may be less than the outer diameter D2 of the rolling bearing 7. The inner diameter D3 of the gas bearing 7 may be greater than the inner diameter D4 of the rolling bearing 7. Here, the outer diameter D2 of the rolling bearing 7 may be the outer diameter of the outer ring 62, and the inner diameter D of the rolling bearing 7 may be the inner diameter of the inner ring 61.

The gas bearing 7 may be the non-contact bearing contacting the rotary shaft 1, the rolling bearing 6 may be the contact bearing in which the inner circumferential surface of the inner ring 61 is always in contact with the rotary shaft 1, and the inner diameter D3 of the bearing 7 may be greater than the inner diameter D4 of the rolling bearing 7.

A bearing clearance G may be defined between the gas bearing 7 and the rotary shaft 1. A bearing clearance G may be defined between the inner circumferential surface of the gas bearing 7 and the outer surface of the small diameter part 12. The bearing clearance G may be defined as a gap between the inner circumferential surface of the gas bearing 7 and the outer surface of the small diameter part 12.

The gas bearing 7 may be a bearing lubricated by the gas, in particular air, disposed in the bearing clearance G. The gas bearing 9 may be the non-contact oilless bearing that supports the rotary shaft 1 in a non-contact state with the rotary shaft 1 when the rotary shaft 1 is not eccentric.

The gas bearing 7 may be eccentric from the center of the rotary shaft 1 toward the impeller 4 in the axial direction L. That is, the gas bearing 7 may face a portion between the axial center of the rotary shaft 1 and the other end 1B of the rotary shaft 1.

When the impeller 4 rotate at the high speed, the air around the bearing housing 5 may be introduced into the bearing housing 5, in particular, the bearing clearance G between the inner circumferential surface of the gas bearing 7 and the outer circumferential surface of the rotary shaft 1 to float the rotary shaft 1.

When the impeller 4 rotates at a high speed, a portion of the air flowing by the impeller 4 may be introduced into the bearing housing 5.

When an axial length L5 of the gas bearing 7 is long, an area of the rotary shaft 1, which is supported by the gas such as air in the rotary shaft 1 may increase, and the gas bearing 7 having the long axial length L5 may more reliably support is the rotary shaft 1. On the other hand, when the axial length L5 of the gas bearing 7 is too long, the length of the rotary shaft 1 is also excessively long, and the gas bearing 7 preferably has an appropriate length.

When a distance L7 between the gas bearing 7 and the rolling bearing 6 is long, a length of a portion (i.e., the supporter 19) of the rotary shaft 1, which is supported by the bearing housing 5, the rolling bearing 6, and the gas bearing 7, may increase to stably support the rotary shaft 1.

When the distance L7 between the gas bearing 7 and the rolling bearing 6 is too long, the length of the rotary shaft 1 is also excessively long, and the gas bearing 7 and the rolling bearing 6 may stably support the rotary shaft and be spaced apart from each other by an approximately distance that does not have to be excessively long.

Referring to FIG. 5, the axial length L5 of the gas bearing 7 is preferably greater than the axial length L6 of the rolling bearing 6. The distance L7 between the gas bearing 7 and the rolling bearing 6 is preferably less than the axial length L5 of the gas bearing 7.

In the motor configured as described above, the gas bearing facing portion 14 and the inner ring contact portion 13 may be supported by the air and rolling bearings 6 introduced between the gas bearing 7 and the rotary shaft 1, respectively.

That is, the rotary shaft 1 may be supported between the rotor coupling portion 17 and the impeller coupling portion 16, i.e., the supporter 19 may be supported at two points, and thus, the rotary shaft 1 may stably rotate at high speed.

In a comparative example of this embodiment, as disclosed in U.S. Patent Publication No. US 2010/0215491 A1 (Published on Aug. 26, 2010), two rolling bearings may be mounted axially spaced apart from each other on the rotary shaft 1, and each of the two rolling bearings that are spaced apart from each other in the axial direction may rotatably support the rotary shaft.

In this comparative example, since the two rolling bearings support the two points of the rotary shaft at positions that are spaced apart from each other in the axial direction, concentric errors of the two rolling bearings may occur. In this case, bearing noise may increase, and lifespan of the bearing may be reduced.

On the other hand, if the rolling bearing 6 and the gas bearing 7 are spaced apart from each other, and the rolling bearing 6 of the rolling bearing 6 and the gas bearing 7 is closer to the rotor 2 as in this embodiment, the noise and the reduction of the lifespan due to the concentric error of the two bearings may be minimized, and the one end 1A and the other end 1B of the rotary shaft 1 of the rotor assembly A may stably rotate without drooping or shaking.

Figure 7:
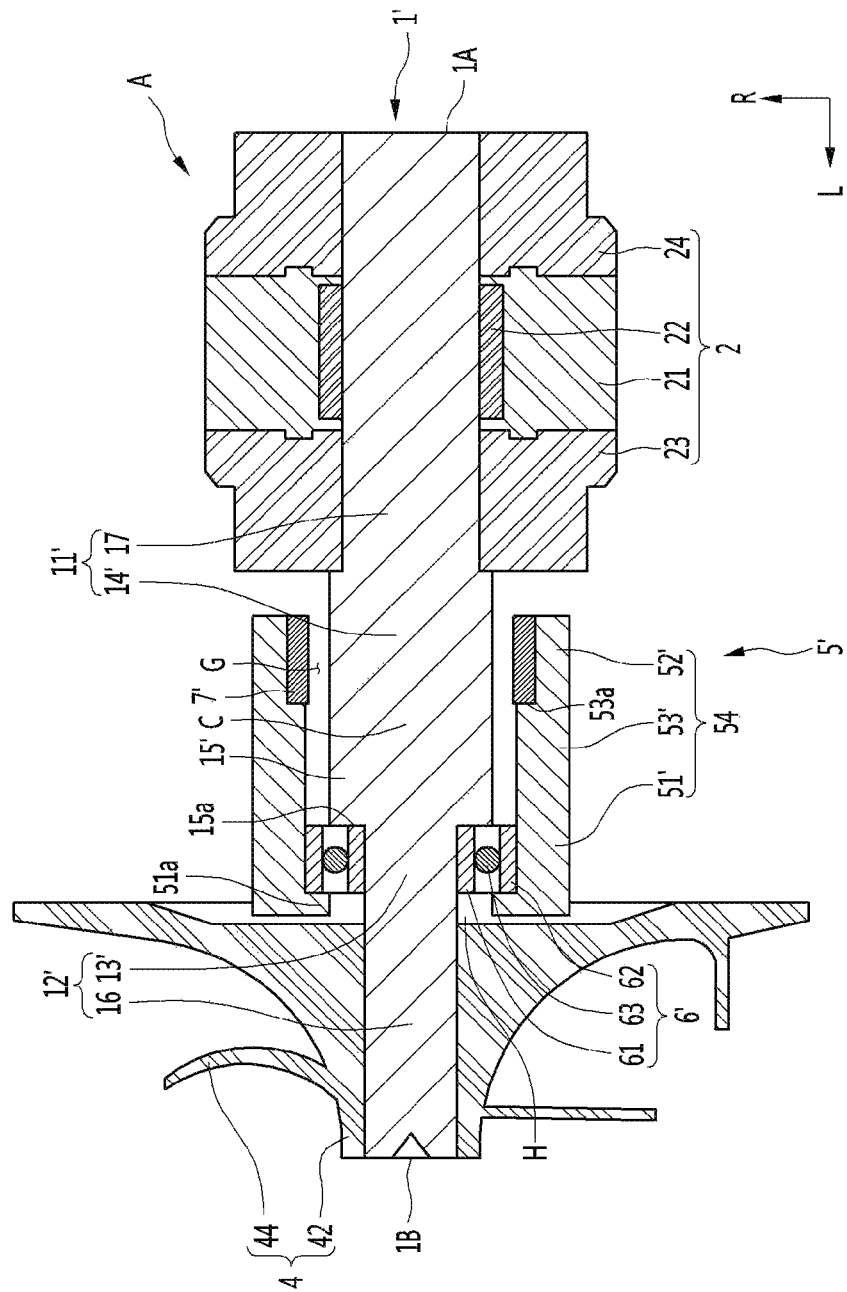
FIG. 7 is a cross-sectional view of a rotor assembly according to another embodiment of the present invention.

FIG. 7 is a cross-sectional view of a rotor assembly according to another embodiment of the present invention.

A motor of this embodiment includes a rolling bearing 6' and a gas bearing 7', which are spaced apart from each other.

The rolling bearing 6' may be disposed between the gas bearing 7' and an impeller 4 in an axial direction L, and the gas bearing 7' may be disposed between the rolling bearing 6' and a rotor 2 in the axial direction L.

The rolling bearing 6' and the gas bearing 7' may be disposed to be spaced apart from each other in the axial direction L in the bearing housing 5'. However, the arrangement position thereof may be opposite to that in an embodiment of the present invention.

The bearing housing 5' may include a rolling bearing housing portion 51' and a gas bearing housing portion 52' and may further include a connector 53'.

The rolling bearing housing 51' may surround an outer surface of the rolling bearing 6' and may face the impeller 4 in the axial direction L.

A hook protrusion 51a that is hooked with an outer ring of the rolling bearing 6 in the axial direction L may be disposed on the rolling bearing housing portion 51'. The hook protrusion 51a may be disposed between the outer ring 62 of the rolling bearing 6' and the impeller 4, and the outer ring 62 of the rolling bearing 6' may be restricted to the hook protrusion 51a and thus be maintained inside the bearing housing 5' without moving toward the impeller 4.

The gas bearing housing portion 52' may surround the outer surface of the gas bearing 7' and may face the rotor 2 in the axial direction L.

The connector 53' may be disposed between the rolling bearing housing portion 51' and the gas bearing housing portion 52' and may connect the rolling bearing housing portion 51' to the gas bearing housing portion 52'.

The connector 53' may be provided to have a stepped portion with respect to the gas bearing housing portion 52'. An inner diameter of the connector 53' may be less than an inner diameter of the gas bearing housing portion 52'.

One end 53a of the connector 53' may function as a hook protrusion hooked with the gas bearing 7' in the axial direction L.

The motor according to this embodiment may be configured to be disposed in order of the rotor 2, the gas bearing 7', the rolling bearing 6', and the impeller 4 in the axial direction L.

The rolling bearing 6' may be disposed closer to the impeller 4 of the rotor 2 and the impeller 4. The rolling bearing 6' may be disposed closer to the impeller 4 of the gas bearing 7 and the impeller 4. The rolling bearing 6' may be different in position from the rolling bearing 6 according to an embodiment of the present invention, and thus, its detailed structure and function may be the same as the rolling bearing 6 according to an embodiment of the present invention. Hereinafter, the rolling bearing 6' according to this embodiment will be described only with the structure different from the rolling bearing 6 according to an embodiment of this invention.

The gas bearing 7' may be closer to the rotor 2 of the rotor 2 and the impeller 4. The gas bearing 7' is different in position from the gas bearing 7 according to the embodiment of the present invention, and thus, its detailed structure and function are the same as those of the gas bearing 6 according to an embodiment of the present invention. The bearing 7' will be described only for the configuration different from the gas bearing 7 according to an embodiment of the present invention.

Hereinafter, the same reference numerals are used for the same components as those of the exemplary embodiment of the present invention, and detailed description thereof will be omitted.

The rotary shaft 1' according to this embodiment may include an impeller coupling portion 16, supporters 13', 14', and 15', and a rotor coupling portion 17. The supporters 13', 14', and 15' may be supported by the rolling bearing 6' and also be supported by the rolling bearing 6' and the gas bearing 7' between the impeller coupling portion 16 and the rotor coupling portion 17.

The supports 13', 14', and 15' may include an inner ring contact portion 13', a gas bearing facing portion 14', and a connecting facing portion 15'.

The inner ring contact 13' may be in contact with the inner ring 61 of the rolling bearing 6'.

When the outer diameter of the inner ring contact portion 13' is large, the rolling bearing 6' may be large in size, and in order to miniaturize the rolling bearing 6', it is preferable that the outer diameter of the inner ring contact portion 13' is small. The rotary shaft 1 preferably has a constant outer diameter of the inner ring contact portion 13' and a constant outer diameter of the impeller coupling portion 16'.

The gas bearing facing portion 14' may face the gas bearing 7' in a radial direction R. An appropriate bearing clearance G may be provided between the gas bearing facing portion 14' and the gas bearing 7'.

The connector facing portion 15' may face the connector 53' in the radial direction R. The connector facing portion 15' may be provided to have a stepped portion with respect to the inner ring contact portion 13'. The outer diameter of the connector facing portion 15' may be greater than the outer diameter of the inner ring contact portion 13'.

One end 15a of the connector facing portion 15' may face the inner ring 61 of the rolling bearing 6 in the axial direction L. The inner ring 61 of the rolling bearing 6' may be hooked by the one end 15a of the connector facing portion 15' in the axial direction L.

The rolling bearing 6' is restricted by the connector facing portion 15' and may not move toward the rotor 2, and the rolling bearing 6' may be supported by the rolling bearing housing portion 51' and the connecting facing portion 15'.

In this case, an outer diameter of the inner ring contact portion 13' and an outer diameter of the gas bearing facing portion 14' may be different from each other. The outer diameter of the gas bearing facing portion 14' and the outer diameter of the connector facing portion 15' may be the same, and the outer diameter of the inner ring contact portion 13' may be less than the outer diameter of the gas bearing facing portion 14'.

The rotary shaft 1' is preferably disposed so as not to be stepped in the axial direction L as much as possible, and the change of the outer diameter in the axial direction L is preferably minimized. The rotary shaft 1' includes a large diameter part 11' and a small diameter part 12'. The rolling bearing 6' is preferably coupled to the small diameter part 12', and the gas bearing 7' is preferably disposed to face the large diameter part 11'.

The large diameter part 11' may include a rotor coupling portion 17, a gas bearing facing portion 14' and a connector facing portion 15'.

In addition, the small diameter part 12' may include an inner ring contact portion 13' and an impeller coupling portion 16.

The diameter of the gas bearing 7' may be small, and the gas bearing 7' may also be disposed to face the small diameter part 12' of the bearing housing 5'. In this case, the diameter of the gas bearing 7' may be minimized. On the other hand, the area on which the gas bearing 7' faces the rotary shaft 1' may be small, and a length of the gas bearing 7' in the axial direction may be long to form a sufficient bearing clearance in which the gas is capable of flowing between the gas bearing 7' and the rotary shaft 1'.

The diameter of the gas bearing 7' may be large, and the gas bearing 7' may also be disposed to face the large diameter part 11' of the bearing housing 5'. In this case, the diameter of the gas bearing 7' may be large. However, an area on which the gas bearing 7' faces the rotary shaft 1' may be large, and a sufficient passage may be secured so that the air or the like flows between the gas bearing 7' and the rotary shaft 1'. In addition, the length of the gas bearing 7' in the axial direction may be minimized.

That is, when it intends to minimizing the length of the axial direction L of the motor, the gas bearing 7' is preferably disposed to face the large diameter part 11'. In addition, in order to reduce the size of the rolling bearing 6', the rolling bearing 6' is preferably coupled to the small diameter part 12'.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present disclosure is to be considered illustrative, and not restrictive, and the technical spirit of the present disclosure is not limited to the foregoing embodiment.

Therefore, the scope of the present disclosure is defined not by the detailed description of the invention but by the appended claims, and all differences within the scope will be construed as being included in the present disclosure.

The invention claimed is:

1. A rotary drive assembly comprising:
   a rotary shaft;
   a rotor mounted on the rotary shaft;
   a stator configured to surround an outer circumference of the rotor;
   an impeller mounted on the rotary shaft and spaced apart from the rotor;
   a bearing housing having a through-hole through which the rotary shaft passes;
   a rolling bearing disposed in the bearing housing and coupled to the rotary shaft; and
   a gas bearing disposed in the bearing housing and spaced apart from the rolling bearing in an axial direction, the gas bearing facing an outer circumferential surface of the rotary shaft,
   wherein the rotor, the rolling bearing, the gas bearing, and the impeller are arranged in order of the rotor, the rolling bearing, the gas bearing, and the impeller along the rotary shaft,
   wherein the bearing housing comprises:
   a rolling bearing housing portion that surrounds an outer surface of the rolling bearing,
   a gas bearing housing portion that is spaced apart from the rolling bearing housing portion in the axial direction and that surrounds an outer surface of the gas bearing, and
   a connector that connects the rolling bearing housing portion to the gas bearing housing portion and that is spaced apart from the outer circumferential surface of the rotary shaft to thereby define an empty space between the connector and the outer circumferential surface of the rotary shaft and between the rolling bearing housing portion and the gas bearing housing portion, wherein the rolling bearing is located closer to the rotor than to the impeller, and the gas bearing is located closer to the impeller than to the rotor, and wherein the gas bearing housing portion includes a lateral surface facing a back surface of the impeller that is axially spaced from the impeller by a gap formed by the lateral surface of the gas bearing housing portion and the back surface of the impeller for air that is introduced into and discharged from the gas bearing.

2. The rotary drive assembly according to claim 1, wherein the rotary shaft comprises:
   an impeller coupling portion to which the impeller is coupled;
   a rotor coupling portion to which the rotor is coupled; and
   a supporter supported by the rolling bearing and the gas bearing, and
   wherein the supporter is disposed between the impeller coupling portion and the rotor coupling portion in the axial direction.

3. The rotary drive assembly according to claim 1, wherein the gas bearing has an inner surface spaced apart from the outer circumferential surface of the rotary shaft, and the outer surface of the gas bearing is configured to contact the gas bearing housing portion of the bearing housing.

4. The rotary drive assembly according to claim 1, wherein the gas bearing has an outer diameter less than an outer diameter of the rolling bearing.

5. The rotary drive assembly according to claim 1, wherein the gas bearing has an inner diameter greater than an inner diameter of the rolling bearing.

6. The rotary drive assembly according to claim 1, wherein the gas bearing is provided with a slit, the slit being long in the axial direction of the gas bearing,
   wherein the gas bearing comprises:
   a bush; and
   a coating layer applied to an inner surface of the bush, and
   wherein the rotary shaft comprises:
   an inner ring contact portion configured to contact an inner ring of the rolling bearing; and
   an impeller coupling portion to which the impeller is coupled, and
   wherein the coating layer faces a portion between the inner ring contact portion and the impeller coupling portion.

7. The rotary drive assembly according to claim 1, wherein the gas bearing housing portion has an inner diameter less than an inner diameter of the rolling bearing housing portion.

8. The rotary drive assembly according to claim 1, wherein the rotary shaft comprises:
   a large diameter part on which the rotor is mounted; and
   a small diameter part on which the impeller and the rolling bearing are mounted,
   wherein the small diameter part comprises:
   an inner ring contact portion configured to contact the rolling bearing; and
   a gas bearing facing portion configured to face the gas bearing in a radial direction, and
   wherein an outer diameter of the inner ring contact portion is equal to an outer diameter of the gas bearing facing portion.

9. The rotary drive assembly according to claim 1, wherein an inner circumferential surface of the bearing housing defines a plurality of recesses that face the outer circumferential surface of the rotary shaft and that are recessed radially away from the outer circumferential surface of the rotary shaft, the plurality of recesses including:
   a first recess that defines an inner surface of the connector and that is recessed radially outward relative to an inner surface of the gas bearing housing portion; and
   a second recess that defines an inner surface of the rolling bearing housing portion and that is recessed radially outward relative to the inner surface of the connector.

10. The rotary drive assembly according to claim 1, wherein the connector extends along the axial direction parallel to the rolling bearing housing portion and the gas bearing housing portion.

11. The rotary drive assembly according to claim 1, wherein the empty space defines a passage of air between an inner circumferential surface of the connector and the outer circumferential surface of the rotary shaft.

12. The rotary drive assembly according to claim 1, wherein the rotary shaft comprises:
    an impeller coupling portion to which the impeller is coupled;
    an inner ring contact portion that contacts an inner ring of the rolling bearing; and
    a gas bearing facing portion that faces the gas bearing in a radial direction, and
    wherein an outer diameter of the inner ring contact portion is equal to an outer diameter of the gas bearing facing portion.

13. A rotary drive assembly comprising:
    a rotor assembly in which a rotor, a rolling bearing, and an impeller are mounted on a rotary shaft to be spaced apart from each other in an axial direction;
    a stator that surrounds an outer circumference of the rotor;
    a bearing housing through which the rotary shaft passes and to which the rolling bearing is fixed; and
    a gas bearing disposed in the bearing housing and spaced apart from the rolling bearing, the gas bearing facing an outer circumferential surface of the rotary shaft,
    wherein the rotary shaft comprises:
    an inner ring contact portion configured to contact the rolling bearing; and
    a gas bearing facing portion configured to face the gas bearing in a radial direction,
    wherein a center of gravity of the rotor assembly is defined between the inner ring contact portion and the gas bearing facing portion or defined at the inner ring contact portion,
    wherein the bearing housing comprises:
    a rolling bearing housing portion that surrounds an outer surface of the rolling bearing,
    a gas bearing housing portion that is spaced apart from the rolling bearing housing portion in the axial direction and that surrounds an outer surface of the gas bearing, and
    a connector that connects the rolling bearing housing portion to the gas bearing housing portion and that is spaced apart from the outer circumferential surface of the rotary shaft to thereby define an empty space between the connector and the outer circumferential surface of the rotary shaft and between the rolling bearing housing portion and the gas bearing housing portion,
    wherein the rolling bearing is located closer to the rotor than to the impeller, and the gas bearing is located closer to the impeller than to the rotor, and
    wherein the gas bearing housing portion includes a lateral surface facing a back surface of the impeller that is axially spaced from the impeller by a gap formed by the lateral surface of the gas bearing housing portion and the back surface of the impeller for air that is introduced into and discharged from the gas bearing.

14. The rotary drive assembly according to claim 13, wherein the gas bearing is located closer to the impeller than to the rolling bearing.

15. The rotary drive assembly according to claim 13, wherein a distance between the center of gravity of the rotor assembly and the inner ring contact portion is less than a distance between the center of gravity of the rotor assembly and the gas bearing facing portion.

16. The rotary drive assembly according to claim 13, wherein the gas bearing has an outer diameter less than an outer diameter of the rolling bearing.

17. The rotary drive assembly according to claim 13, wherein the gas bearing has an inner diameter greater than an inner diameter of the rolling bearing.

\* \* \* \* \*